Oct. 13, 1953 J. D. SEABERT Re. 23,724

IMMERSIBLE ELECTRODYNAMIC LOUD-SPEAKER

Original Filed June 29, 1944

Inventor
JOHN D. SEABERT
By
C. D. Tuska
Attorney

Reissued Oct. 13, 1953 Re. 23,724

UNITED STATES PATENT OFFICE 23,724

IMMERSIBLE ELECTRODYNAMIC LOUDSPEAKER

John D. Seabert, Haddon Heights, N. J., assignor to Radio Corporation of America, a corporation of Delaware Original No. 2,517,138, dated August 1, 1950, Serial No. 542,745, June 29, 1944. Application for reissue July 28, 1951, Serial No. 239,125

12 Claims. (Cl. 179—115.5)

Figure 1:
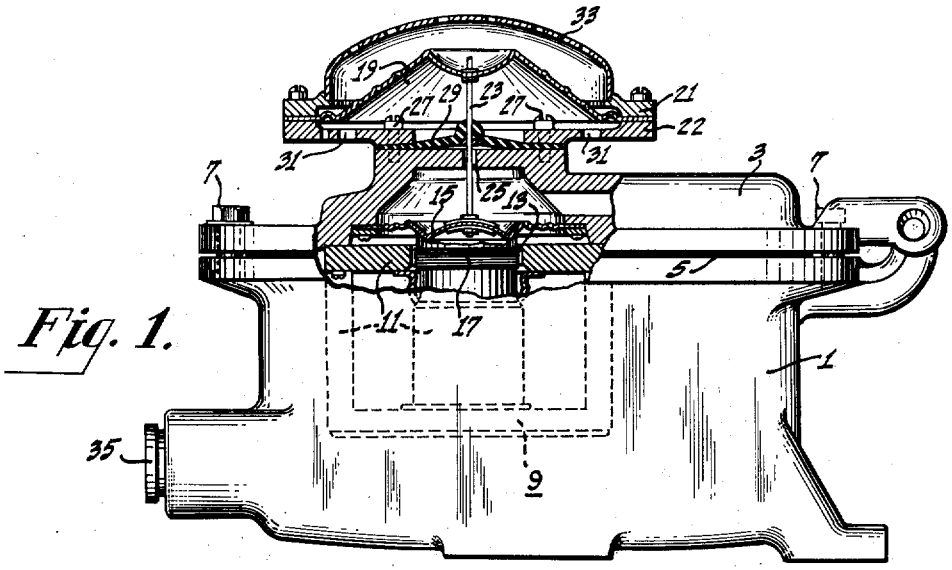

Matter enclosed in heavy brackets [ ] appears in the original patent but forms no part of this reissue specification; matter printed in italics indicates the additions made by reissue.

This invention relates to signal translating apparatus, and more particularly to a loudspeaker especially suitable for use as part of an announce system or the like on submarines.

It has been found very expedient in naval craft to use telephone systems or the like for communication between various parts of ships, for issuing orders, making announcements, etc. On submarines, it has been found desirable to employ announce systems utilizing loudspeakers which are mounted on the bridge. Due to the fact that submarines must often submerge quickly, conventional loudspeakers are entirely unsuited for such operation.

The primary object of my present invention is to provide a novel loudspeaker which is especially useful on the bridges of submarines.

More particularly, it is an object of my present invention to provide an improved loudspeaker which can be used in air and which can be submerged in water without requiring any alteration or protective devices before submersion.

Another object of my present invention is to provide an improved loudspeaker as aforesaid which is capable of withstanding water pressure of the order of 200 pounds per square inch.

Still another object of my present invention is to provide an improved loudspeaker as aforesaid which is instantly ready for operation when brought out of the water into the air.

It is also an object of my present invention to provide an improved loudspeaker as aforesaid which is fairly simple in construction, quite economical in cost, and highly efficient in use.

In accordance with the present invention, I provide a water-tight casing which may comprise a pot and a removable cover therefor adapted to be arranged in water-tight relation with the pot. Within the pot is housed an electromechanical motor. This motor is preferably of the electrodynamic type and includes a field structure arranged entirely within the pot of the casing. A voice coil assembly is vibratively mounted on the inner surface of the cover and is connected by means of a coupling rod which passes through an opening in the cover to a sound radiating diaphragm which is vibratively carried by the cover on the outside thereof. The diaphragm, which is made of waterproof material, is exposed on both sides thereof to the ambient and may be protected from injury by a suitable, perforated casing. A flexible seal surrounds the coupling rod in fluid-tight relation therewith and covers the aforementioned opening so as to prevent water from entering into the casing when the loudspeaker is submerged in water.

The diaphragm and the voice coil assembly operate in unison in response to actuating signal forces applied to the voice coil assembly by the electromechanical motor, the coupling rod driving the diaphragm in response to movement of the voice coil assembly. Thus, the diaphragm can be made to radiate sound when operating in the air. When the submarine is submerged, the water surrounds the diaphragm and, since it is exposed on both sides to the water, the water pressure is equalized against both surfaces thereof. At the same time, the water presses against the aforementioned seal around the driving rod and forces it against the opening in the cover through which the drive rod passes. In this way, water is prevented from entering the casing and injuring the parts housed therein. Cable connections from the voice coil, field coil, transformers, and other parts of the loudspeaker mechanism within the casing may be brought out from the casing through suitable, water-tight couplings.

Figure 2:
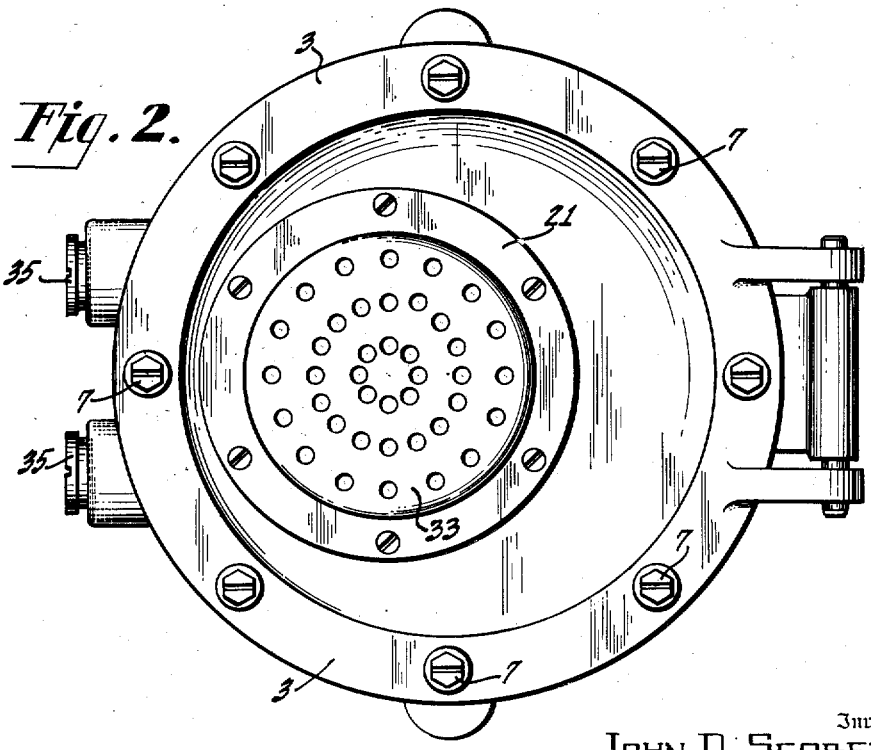

The novel features that I consider characteristic of my invention are set forth with particularity in the appended claims. The invention itself, however, both as to its organization and method of operation, as well as additional objects and advantages thereof, will best be understood from the following description of one embodiment thereof when read in connection with the accompanying drawing, in which Figure 1 is a side view, partly in section, of one form of loudspeaker constructed according to my present invention, and Figure 2 is a top, plan view thereof.

Referring more particularly to the drawing, wherein similar reference characters designate corresponding parts throughout, there is shown a casing comprising a box or pot 1 and a cover 3 hingedly connected to the pot 1 and adapted to be clamped in water-tight relation therewith through an intervening gasket 5 by means of a plurality of bolts 7. Within the pot 1 is housed a suitable electromechanical motor or converter 9 which I have shown as being of the dynamic type, although it may be of any other suitable type. The motor 9 includes a field structure 11 provided with an air gap 13.

Vibratively mounted on the inside of the cover 3 is a voice coil assembly comprising a small diaphragm or vibratory member 15 having a voice coil 17 located in the air gap 13 in known manner. A second diaphragm or vibratory member 19 is vibratively mounted between a pair of clamping members 21 and 22 and is connected to the diaphragm 15 by a coupling rod 23 which passes through an opening 25 in the cover 3. The assembly comprising the clamping members 21 and 22 and the diaphragm 19 is carried on the cover 3 and may be connected thereto by a plurality of bolts or the like 27. A flexible gasket 29 of rubber or any other suitable material is clamped between the clamping member 22 and the top of the cover 3 and has an opening therein through which the coupling rod 23 extends. The gasket 29 tightly embraces the coupling rod 23 and is arranged over the cover opening 25 to prevent the passage of water, air, or other fluid between the exterior and interior of the casing 1, 3. A plurality of openings 31 in the clamping member 22 and a perforated protective screen or the like 33 serve to expose both sides or surfaces of the sound radiating diaphragm 19 to the ambient, whether it be the air or the water. Connection of the loudspeaker to suitable external apparatus, such as a microphone, an amplifier, batteries and the like may be made through suitable fluid-tight couplings 35 in well known manner.

A loudspeaker such as described above may be mounted on the bridge of a submarine or in any other suitable location as a part of an announce system or the like. During operation in the air, signal forces applied to the motor 9 effect vibration of the diaphragm 15 which, in turn, drives the diaphragm 19 through the coupling rod 23 to radiate sound. The seal 29 is sufficiently flexible to permit substantially unhampered vibration of the vibratory system. When the submarine is submerged, the water surrounds the diaphragm 19 with equal pressure on both sides thereof and it also presses the seal 29 against the cover 3. Since the casing 1, 3 is fluid-tight, no water will enter therein. The diaphragm 19 is made of suitable, waterproof material, such as cloth impregnated with Bakelite or other suitable, resinous material, and, since the water pressure on both sides thereof is equal, it will not be damaged. I have found that water pressures of the order of 200 pounds per square inch have failed to damage the diaphragm 19. Thus, no protective devices need be applied to this loudspeaker before the submarine is submerged. When the submarine rises to the surface, the loudspeaker is immediately ready for operation without requiring any adjustments or manipulations to render it suitable for use.

Although I have shown and described but one form of my present invention, it will undoubtedly be apparent to those skilled in the art that many other forms thereof, as well as variations in the particular one described, are possible within the spirit of my invention. I therefore desire that my invention shall not be limited except insofar as is made necessary by the prior art and by the spirit of the appended claims.

I claim as my invention:

1. In signal translating apparatus, the combination of a fluid-tight casing having a hinged cover provided with an opening, an electromechanical converter including a first vibratory member within said casing, a second vibratory member outside of said casing, means coupling said first and second vibratory members for movement in unison, said coupling means comprising an element passing through said opening, said hinged cover supporting said first and second vibratory members and containing a flexible seal over said opening and around said element in fluid-tight relation therewith for preventing the passage of fluid between the exterior and interior of said casing, the flexibility of said seal permitting substantially unhampered movement of said element and said vibratory members, and limiting means carried by said hinged cover for limiting inward movement of said flexible seal when said apparatus is subjected to abnormal, external fluid pressure.

2. In signal translating apparatus, the combination of a fluid-tight casing having a hinged cover provided with an opening, an electromechanical converter including a first vibratory member within said casing, a second vibratory member outside of said casing, said hinged cover including supporting means for each of said vibratory members, said second vibratory member supporting means having apertures therein for exposing both sides of said last named member to the ambient, means coupling said first and second vibratory members for movement in unison, said coupling means comprising an element passing through said opening, a flexible seal over said opening and around said element in fluid-tight relation therewith for preventing the passage of fluid between the exterior and interior of said casing, the flexibility of said seal permitting substantially unhampered movement of said element and said members, and means for limiting inward movement of said flexible seal when said apparatus is subjected to abnormal, external fluid pressure.

3. In signal translating apparatus, the combination of a fluid-tight casing having a hinged cover provided with an opening, an electromechanical converter including a first vibratory member within said casing, a second vibratory member outside of said casing, said hinged cover including supporting means for each of said vibratory members, a perforated auxiliary housing for said second vibratory member on said cover for exposing both sides of said last named member to the ambient, means coupling said first and second vibratory members for movement in unison, said coupling means comprising an element passing through said opening, a flexible seal over said opening and around said element in fluid-tight relation therewith for preventing the passage of fluid between the exterior and interior of said casing, the flexibility of said seal permitting substantially unhampered movement of said element and said members, and means for limiting inward movement of said flexible seal when said apparatus is subjected to abnormal, external fluid pressure.

4. In a loudspeaker, the combination of a fluid-tight casing having a hinged cover provided with an opening therein, an electromechanical motor including a vibratory member supported within said casing by said cover, a vibratory diaphragm supported outside of said casing by said cover, means coupling said vibratory diaphragm to said vibratory member for movement in unison therewith in response to actuating forces applied to said vibratory member by said motor, said coupling means comprising an element passing through said opening, a flexible seal over said opening and around said element in fluid-tight relation therewith for preventing the passage of fluid between the exterior and interior of said casing, the flexibility of said seal permitting substantially unhampered movement of said element, and limiting means carried by said cover for limiting inward movement of said flexible seal when said loudspeaker is subjected to abnormal, external fluid pressure.

5. In a loudspeaker, the combination of a fluid-tight casing having a hinged cover provided with an opening, an electromechanical motor including a vibratory member supported by said cover and disposed within said casing, a vibratory diaphragm supported by said cover and disposed on the outside of said casing, the support for said diaphragm having apertures therein for exposing both sides of said diaphragm to the ambient, means coupling said diaphragm to said vibratory member for movement in unison therewith in response to actuating forces applied to said vibratory member by said motor, said coupling means comprising an element passing through said opening, a flexible seal over said opening and around said coupling means in fluid-tight relation therewith for preventing the passage of fluid between the exterior and interior of said casing, the flexiblity of said seal permitting substantially unhampered movement of said coupling means, and additional means carried by said cover for limiting inward movement of said flexible seal when said loudspeaker is subjected to abnormal, external fluid pressure.

6. In a loudspeaker, the combination of a fluid-tight casing comprising a pot and a hinged cover adapted to be brought into fluid-tight relation with said pot, an electromechanical motor mounted within said pot, said motor including a first vibratory diaphragm, a second vibratory diaphragm carried by said cover on the outside thereof, said hinged cover including a peripheral support for each of said diaphragms, said first diaphragm being concealed within said casing, said second diaphragm support having apertures therein for exposing both sides of said last named diaphragm to the ambient, and means coupling said diaphragms to each other for movement in unison in response to actuating forces applied to said first diaphragm by said motor.

7. In a loudspeaker, the combination of a fluid-tight casing comprising a pot and a cover adapted to be brought into fluid-tight relation with said pot, an electromechanical motor of the dynamic type within said casing and including a field structure housed within said pot, said motor also including a first diaphragm vibratively mounted on the inside of said cover, a second diaphragm vibratively mounted on the outside of said cover, a peripheral support for each of said diaphragms, said second diaphragm support having apertures therein for exposing both side of said last named diaphragm to the ambient, and means coupling said diaphragms to each other for movement in unison in response to actuating forces applied to said first diaphragm by said motor.

8. In a loudspeaker, the combination of a casing comprising a pot and a cover hingedly connected to said pot and adapted to be brought into closed, fluid-tight relation with said pot, an electromechanical motor within said pot, said motor including a first vibratory diaphragm concealed within said casing when said cover is closed, a second vibratory diaphragm carried by said cover outside of said pot, a peripheral support for each of said diaphragms, said second diaphragm peripheral support having apertures therein for exposing both sides of said last named diaphragm to the ambient, and means coupling said diaphragms to each other for movement in unison in response to actuating forces applied to said first diaphragm by said motor.

9. A loudspeaker according to claim 8 characterized in that said motor is of the dynamic type and includes a field structure within said pot, said field structure having an air gap, and characterized further in that said first diaphragm is also vibratively carried by said cover but on the inside thereof, said first diaphragm including an operating coil adapted to be received in said air gap when said cover is closed.

*10. In signal translating apparatus, the combination of a fluid-tight casing having a cover provided with an opening, an electromechanical converter including a first vibratory member within said casing, a second vibratory member outside of said casing, said cover including supporting means for each of said vibratory members, said second vibratory member supporting means having apertures therein for exposing both sides of said last-named member to the ambient, means coupling said vibratory members for movement in unison, said coupling means comprising an element passing through said opening, said cover containing a flexible seal over said opening and around said element in fluid-tight relation therewith for preventing the passage of fluid between the exterior and interior of said casing, and the flexibility of said seal permitting substantially unhampered movement of said element and said vibratory members.*

*11. In signal translating apparatus, the combination of a fluid-tight casing having a cover provided with an opening, an electromechanical converter including a first vibratory member within said casing, a second vibratory member outside of said casing, said cover including supporting means for each of said vibratory members, a perforated auxiliary housing for said second vibratory member on said cover for exposing both sides of said last named member to the ambient, means coupling said first and second vibratory members for movement in unison, said coupling means comprising an element passing through said opening, and a flexible seal over said opening and around said element in fluid-tight relation therewith for preventing the passage of fluid between the exterior and interior of said casing.*

*12. In a signal translating apparatus, the combination of a fluid-tight casing comprising a pot and a cover adapted to be brought into fluid-tight relation with said pot, said pot and cover excluding the ambient, an electromechanical motor mounted within said pot, said motor including a first vibratory member, a second vibratory member carried by said cover on the outside thereof, said cover including a support for said second vibratory member, said first vibratory member being concealed within said casing, and said second vibratory member support having apertures therein for exposing both sides of said last named vibratory member to the ambient, and means coupling said vibratory members to each other for movement in unison.*

JOHN D. SEABERT.

References Cited in the file of this patent or the original patent

UNITED STATES PATENTS

| Number | Name | Date |
|---|---|---|
| 352,472 | Lungen | Nov. 9, 1886 |
| 353,274 | Tucker et al. | Nov. 23, 1886 |
| 1,523,964 | Horig | Jan. 20, 1925 |
| 2,236,973 | King | Apr. 1, 1941 |
| 2,276,022 | Cox | Mar. 10, 1942 |
| 2,346,429 | Harrison | Apr. 11, 1944 |
| 2,400,281 | Anderson | May 14, 1946 |